United States Patent [19]
Lovitt et al.

[11] 3,867,198

[45] Feb. 18, 1975

[54] METHOD OF CLEANING THE SURFACE OF A DECORATIVE PLASTIC LAMINATE

[75] Inventors: Dennis Ronald Lovitt; Gene Edward Grosheim, both of Cincinnati; Richard Frederick Jaisle, Harrison, all of Ohio

[73] Assignee: Formica Corporation, Cincinnati, Ohio

[22] Filed: June 13, 1973

[21] Appl. No.: 369,661

[52] U.S. Cl. ............... 134/29, 134/40, 134/42, 156/323, 264/233
[51] Int. Cl. .................................... B08b 3/10
[58] Field of Search ........... 134/2, 29, 40, 42; 252/79.5, 156; 156/289, 323; 264/233, 344; 8/137.5, 139, 183, 94.13, 94.19 C, 94.2

[56] References Cited
UNITED STATES PATENTS

| | | | |
|---|---|---|---|
| 2,259,260 | 10/1941 | Matteson et al. | 134/29 X |
| 2,878,188 | 3/1959 | Callahan | 134/40 UX |
| 3,145,180 | 8/1964 | Dupré et al. | 134/29 UX |
| 3,183,054 | 5/1965 | Fischer et al. | 8/94.2 X |

Primary Examiner—Robert L. Lindsay, Jr.
Assistant Examiner—Marc L. Caroff
Attorney, Agent, or Firm—Frank M. Van Riet

[57] ABSTRACT

A method for removing contaminants imparted to the resin-impregnated surface of a decorative laminate by an aluminum release foil used during the manufacture of the laminate whereby the laminate retains good stain resistance and unaltered gloss properties. The surface is contacted with an alkali metal hydroxide cleaning solution for 1 to 15 seconds at a temperature of 30°C. to 90°C. The concentration of the alkali metal hydroxide in solution is 2.5% to 50% by weight.

6 Claims, No Drawings

METHOD OF CLEANING THE SURFACE OF A DECORATIVE PLASTIC LAMINATE

BACKGROUND OF THE INVENTION

For many years, decorative high pressure laminates have been used as a surfacing material in residential and commercial structures where aesthetic effects are desired in combination with functional behavior, such as wear, heat and stain resistance. Typical applications are surfacing for walls, partitions, table tops, counter tops, furniture, doors and many other uses. In making such laminates it is conventional to utilize a plurality of superimposed resin impregnated core sheets generally composed of kraft paper which have been impregnated with a thermosetting phenolic resin. The number of plies in the core will depend upon the ultimate intended use of the laminate. For most purposes, the number of these core sheets will total about six to nine. For decorative laminates, there is then placed upon the stack of core sheets, a decorative sheet which is generally a sheet of alpha-cellulose paper bearing a printed design or a light color and impregnated with a noble thermosetting resin (see U.S. Pat. Nos. 3,373,068 and 3,418,189) which is not subject to any significant darkening upon the application of heat. Resins for the decorative sheets are aminotriazine resins and additionally the unsaturated polyester resins, the epoxy resins and the like.

It is generally desirable when making decorative laminates, to make use of a protective overlay sheet which is similar to the decorative sheet but generally devoid of design and which in the final laminate is transparent. The stacked plies are then heat and pressure consolidated into a unitary structure in which the press plate is of polished stainless steel. Such an approach produces a very smooth surface laminate with a glossy finish.

For the highest quality lustrous finish it is desirable to polish the surface further with a cotton buff employing a very mild polishing compound. From the mid 40's to the late 50's most decorative laminates were desired in a polished finish. The application of laminates on kitchen work tops influenced this choice. As laminates were accepted in more formal settings such as desk tops, occasional tables, bedroom furniture and the like, lower gloss levels were desired. To accomplish this, the laminate was rubbed or brushed with a mild abrasive, such as pumice, dispersed in a suitable liquid vehicle, such as oil or water. This operation was called dulling or dull rubbing. The surface gloss is reduced because a microfraction of the melamine surface is abraded away, however, the color of the laminate is altered and the stain resistance of the surface is diminished.

These gloss-controlling operations generally were carried out on a glossy finish laminate since most attempts to obtain a matte or dull finish directly from a press plate were unsuccessful. The laminator was not only confronted with a high cost of the preparation of the plates but was also faced with a serious refinishing problem in the likely event they were scratched or damaged. Most attempts at using plates of this type resulted in a decorative surface which was so gray in appearance that it was practically useless. Among other problems was the fact that these laminate surfaces were extremely difficult to clean.

In the early 1960's so called "textured" or "suede finished" laminates were successfully produced by the use of a ½-mil aluminum foil having a matte or polish finish and bonded to a 40-lb. basis weight kraft paper. Later the aluminum was available also with a litho paper backing. This release layer was interposed between the surface of the decorative laminate assembly and the press plate prior to the heat and pressure consolidation. Obviously the aluminum was faced towards the decorative surface. The so-called suede finished laminate is noticeably non-smooth in appearance and to touch. The finish blends very well with real wood components or low or medium gloss furniture which were popular at the time.

The suede finish type laminates, made by using the aluminum release sheet method, were widely accepted by the trade. Subsequent to the growing demand for these suede or textured surface laminates, and particularly on white and pastel solid color laminates, discoloration began to appear in various forms which was attributed to contaminants, such as rolling oils and release agents, remaining on the aluminum which were transferred to the solid color decorative surface during the heat and consolidation step of the laminate manufacture.

The foil suppliers made many efforts to decontaminate the aluminum but none were successful, and the number of laminates rejected for discolored, dirty, contaminated surfaces grew into significantly high losses for the laminator.

The contaminants on the laminate surface are generally organic materials, e.g. release agents, rolling oils etc., alone or with microscopic inclusion therewith of aluminum particles inherent on and/or in the aluminum foil as the result of processing during the manufacture of the foil.

Investigators have recognized and tried to solve the problem of residual oils in and/or on aluminum foil but without success, see Ingram O. Robertson, Use of Aluminum Foil Release Sheet in Decorative Laminates, TAPPI, Vol. 55, No. 9, Pages 1341–1344, September 1972.

The instant applicants were seeking a medium gloss for a laminate finish in the range of 30 to 40 as measured by a 60° Gardner Gloss meter. Attempts to clean the laminate surface by mechanically scrubbing or dulling the surface using brushes and a water insoluble abrasive such as pumice were only partially successful in that the surface could be cleaned but the gloss of the surface was significantly reduced to a Gardner reading of about 11 which is unacceptable by customers wishing a medium type gloss finish. In addition, the stain resistance of the surface was appreciably diminished because the dulling removes a microfraction of the glaze of melamine resin as mentioned above, along with paper fibers, from the surface of the laminate immediately making it more prone to attack by staining materials because the ends of the paper fibers are exposed.

SUMMARY OF THE INVENTION

An experiment was then conducted on a contaminated laminate using a dilute, solution of sodium hydroxide in an attempt to clean the surface. Surprisingly and unexpectedly, all of the samples treated were cleaned more effectively and efficiently than the earlier methods. Furthermore, all the desirable features of medium gloss suede finish laminates, especially their excellent resistance to stain and nondirectional character, were preserved.

DESCRIPTION OF THE INVENTION INCLUDING PREFERRED EMBODIMENTS

As mentioned above, we have now discovered a method for removing contaminants imparted to the surface of a decorative laminate wherein an aluminum release sheet foil is used during the manufacture of the laminate. The method comprises contacting the contaminated decorative laminate surface with a solution consisting essentially of a hot, dilute solution of an alkali metal hydroxide.

The term alkali metal as used in the specification and claims is intended to refer to sodium, potassium, lithium, cesium and rubidium. Of these, the preferred alkali metals are sodium, potassium and lithium and hence, hereinafter reference will be made to hydroxides of these elements. Accordingly, the preferred alkali metal hydroxides for use in the present invention are sodium hydroxide, potassium hydroxide and lithium hydroxide.

The preferred solvent is water, however, other solvents may be used such as ethyl alcohol and the like.

In formulating alkaline solutions for cleaning laminates in accordance with the present invention, the alkali metal hydroxide is dissolved in e.g. water at room temperature in amounts within the range from about 2.5% by weight, of the alkali metal hydroxide to about 50%, by weight, based on the total weight of the solution. Preferably the cleaning solution contains from 2.5% to 20%, by weight, same basis, of the alkali metal hydroxide.

The cleaning solutions are used at elevated temperatures of between about 30°C. and 90°C., preferably 50°C.-90°C. for from about 1 to about 15 seconds, preferably 3–10 seconds, the higher temperatures enabling the use of lower contact times. Similarly, higher concentrations of hydroxide result in lower contact times and lower temperatures and concentrations necessitate higher contact times. The severity of the contamination of the laminate surface also effects the contact time necessary to produce a satisfactory cleaning of the surface. Generally, however, the maximum contact time and the maximum solution temperature are determined by economics and safety rather than cleaning effectiveness.

The cleaning solution may be applied to the laminate surface in any convenient manner such as dipping, spraying or flooding the cleaning solution onto the contaminated surface of the laminate.

Following the cleaning operation, the laminates are preferably rinsed with water and dried before storage or ultimate usage in the desired service application.

The following examples are set forth by way of illustration only and are not construed as limitations on the present invention except as set forth in the appended claims. All parts and percentages are by weight unless otherwise specified.

EXAMPLE 1

Eight sheets of a thermosetting phenol-formaldehyde resin impregnated kraft paper are arranged in a superimposed relationship on a polished steel plate. A beige solid color decorative sheet of alpha-cellulose paper impregnated with a thermosetting melamine-formaldehyde resin in a content of about 50%, by weight, of the melamine-formaldehyde resin is superimposed on the core sheets. On the solid color sheet there is positioned a commercially available aluminum foil release sheet. The release sheet consists of a 0.5 mil shiny finish, full hard temper, aluminum foil laminated to a lithographic grade paper. The shiny side of the aluminum foil faces toward the decorative solid color sheet of the laminate assembly. A stainless steel plate is placed on top of the litho backed foil. The entire assembly is then inserted into a press and heat and pressure consolidated to a unitary structure using 1400 psi pressure and heating at 144°C. for 20 minutes and then cooling and removing from the press. The laminate is separated from the press plates and the aluminum foil release sheet is stripped from the decorative surface of the laminate. The surface of the laminate has an attractive pleasing texture, however, the color of the laminate is significantly altered by a splotchy, muddied, contaminated appearance. The Gardner 60° gloss of the surface is determined to be 36–37.

The laminate is conveyed up to a machine having three chambers. The first chamber has an upper and lower housing, the upper housing being provided at the top with a plurality of openings for hoses which extend into the upper part of the chamber. The hoses are connected to a steam jacketed reservoir tank containing a 5.0%, by weight, sodium hydroxide aqueous cleaning solution which is held at 70°C. The tank is provided with a pump whereby when the pump is actuated, the cleaning solution is forced through the plurality of hoses and into the upper chamber. The lower part of the chamber has a drain in which the excess cleaning solution is returned to the reservoir tank and recycled to the upper part of the chamber by the pump system.

The machine is turned on, the reservoir tank pump is started and the cleaning fluid is flooded onto the conveyed laminate as it passes through the first chamber. The conveyor speed is adjusted so that the laminate is immersed in the cleaning solution for about 5 seconds. The laminate then passes through a second chamber wherein water is sprayed onto the laminate rinsing off any cleaning solution. Subsequently the laminate passes through a third chamber which is heated and the laminate is dried with forced hot air. The laminate is removed from the conveyor and a careful inspection of the surface reveals that all discoloration and contaminants are removed from the decorative surface. The Gardner 60° gloss of the resultant surface is still 36–37. The laminate passes NEMA Standards Laminate Thermosetting Sheets PUB. NO. LD 1–1971, Reagents 1–29. The nondirectional character of the surface imparted by the aluminum release sheet is retained.

EXAMPLE 2

Example 1 is repeated in all essential details except that in place of using the beige solid color decor sheet, a white oak printed alpha-cellulose decor sheet impregnated with a thermosetting melamine-formaldehyde in a resin content of 40% is used and on top of this layer is superimposed a protective overlay containing 65% melamine-formaldehyde resin, by weight. On the overlay is positioned the commercially available aluminum foil release described in Example 1. After cleaning of the resultant contaminated surface of the laminate as in Example 1, the gloss, stain-resistance and nondirectional character of the laminate surface remain intact.

EXAMPLE 3 (Comparative)

Example 1 is repeated in all essential details except that instead of passing the contaminated laminate through the cleaning solution, the surface is treated with a pumice slurry and brushed. The resultant laminate surface is inspected and found to be clean but severely abraded. Gloss readings are taken and found to be only about 10–11. Stain tests are made and the surface shows superficial staining with Reagents 21–29 of said test. Brush marks in lengthwise direction of the surface give it undesirable directional character.

EXAMPLE 4

Example 1 is repeated in all essential details except that lithium hydroxide is used in place of sodium hydroxide in the cleaning solution. After the laminate is cleaned, rinsed and dried, the laminate is inspected. The results are comparable to those of Example 1.

EXAMPLE 5

Example 1 is repeated in all essential details except that potassium hydroxide is used in place of the sodium hydroxide in the cleaning solution. After the laminate is cleaned, rinsed and dried, the laminate is inspected. The results are again comparable to those of Example 1.

EXAMPLE 6 (COMPARATIVE)

Example 1 is repeated in all essential details except that ammonium hydroxide is used in place of the sodium hydroxide in the cleaning solution. After the laminate is passed through the cleaning solution, rinsed and dried and then inspected, the laminate is still discolored and dirty and is unsatisfactory.

EXAMPLE 7

Example 1 is repeated in all essential details except that the temperature of the cleaning solution is reduced to 50°C. After the laminate is passed through the cleaning solution, rinsed and dried, the surface is inspected. The results are comparable to those of Example 1.

EXAMPLE 8

Again following the procedure of Example 1 except that the sodium hydroxide concentration is reduced to 2.5% and the solution temperature is raised to 90°C., comparable results are observed.

EXAMPLE 9

When the procedure of Example 8 is again followed but the contact time of the solution with the laminate is reduced to about 1 second and the sodium hydroxide concentration is raised to 50%, the surface is again judged clean. The stain resistance and nondirectional character of the laminate is as described in Example 1.

EXAMPLE 10

Following the procedure of Example 1 except that the hydroxide concentration is reduced to 2.5% and the contact time is increased to 15 seconds, comparable results are achieved.

Following the procedure of Example 1, the concentrations, temperatures, contact times and hydroxides are varied according to the limits set forth hereinabove. The results are set forth in Tables I–VI, below.

TABLE I

TESTING THE CLEANING ABILITY OF DIFFERENT ALKALI METAL HYDROXIDES AT VARIOUS CONCENTRATIONS (AQUEOUS SOLUTION) ON A BEIGE SOLID COLOR LAMINATE - HOLDING TEMPERATURE AT 70°C. — IMMERSION FIVE SECONDS

| Hydroxide | 2.5% | 5.0% | 10.0% | 20.0% |
| --- | --- | --- | --- | --- |
| Sodium Hydroxide | surface remains partially contaminated | surface clean | surface clean | surface clean |
| Potassium Hydroxide | surface remains contaminated | surface clean | surface clean | surface clean |
| Lithium Hydroxide | surface remains partially contaminated | surface clean | surface clean | surface clean |
| Ammonium Hydroxide (Comparative) | surface remains contaminated | surface remains contaminated | surface remains contaminated | surface remains contaminated |
| Calcium Hydroxide (Comparative) | surface remains contaminated | surface remains contaminated | surface remains contaminated | surface remains contaminated |

TABLE II

CLEANING ABILITY OF DIFFERENT ALKALI METAL HYDROXIDES ON A SOLID COLOR BEIGE LAMINATE HOLDING CONCENTRATION AT 5% AQUEOUS SOLUTION — IMMERSION AT FIVE SECONDS AND VARYING TEMPERATURES

| Hydroxide | 30°C. | 40°C. | 50°C. | 60°C. | 70°C. | 80°C. | 90°C. |
| --- | --- | --- | --- | --- | --- | --- | --- |
| Sodium Hydroxide | surface remains contaminated | surface remains partially contaminated | surface clean | surface clean | surface clean | surface clean | surface clean |
| Potassium Hydroxide | surface remains contaminated | surface remains contaminated | surface remains contaminated | surface remains partially contaminated | surface clean | surface clean | surface clean |
| Lithium Hydroxide | surface remains contaminated | surface remains contaminated | surface remains contaminated | surface remains contaminated | surface clean | surface clean | surface clean |
| Ammonium Hydroxide (Comparative) | surface remains contaminated | surface remains contaminated | surface remains contaminated | surface remains contaminated | surface remains contaminated | surface remains contaminated | surface remains contaminated |
| Calcium Hyroxide (Comparative) | surface remains contaminated | surface remains contaminated | surface remains contaminated | surface remains contaminated | surface remains contaminated | surface remains contaminated | surface remains contaminated |

TABLE III

TESTING THE CLEANING ABILITY OF DIFFERENT ALKALI METAL HYDROXIDES AT VARIOUS CONCENTRATIONS IN AN ETHYL ALCOHOL SOLVENT — TEMPERATURE HELD AT 70°C. — IMMERSION TIME FOR FIVE SECONDS

| Hydroxide | 2.5% | 5.0% | 10.0% | 20.0% |
|---|---|---|---|---|
| Sodium Hydroxide | surface remains partially contaminated | surface clean | surface clean | surface clean |
| Potassium Hydroxide | surface remains partially contaminated | surface remains partially contaminated | surface remains partially contaminated | surface clean |

TABLE IV

TESTING CLEANING ABILITY OF DIFFERENT ALKALI METAL HYDROXIDES IN ETHYL ALCOHOL SOLVENT—VARYING TEMPERATURE—HOLDING CONCENTRATION AT 5% AND IMMERSION TIME AT FIVE SECONDS

| Hydroxide | 40°C. | 50°C. | 60°C. | 70°C. |
|---|---|---|---|---|
| Sodium Hydroxide | surface remains partially contaminated | surface remains partially contaminated | surface remains partially contaminated | surface clean |
| Potassium Hydroxide | surface remains partially contaminated | surface remains partially contaminated | surface remains partially contaminated | surface clean |

TABLE V

TESTING THE CLEANING ABILITY OF A 50% SODIUM HYDROXIDE AQUEOUS SOLUTION - IMMERSION FOR FIVE SECONDS - TEMPERATURE VARYING

| Hydroxide | 25°C. | 30°C. | 40°C. | 50°C. | 60°C. | 70°C. |
|---|---|---|---|---|---|---|
| Sodium Hydroxide | surface remains partially contaminated | surface clean | surface clean | surface clean | surface clean | surface clean |

TABLE VI

CLEANING ABILITY OF 5% AQUEOUS SODIUM HYDROXIDE SOLUTION ON A BEIGE SOLID COLOR LAMINATE HOLDING TEMPERATURE AT 70°C. AND VARYING IMMERSION TIME IN SECONDS

| Hydroxide | 1.0 Sec. | 2.0 Sec. | 3.0 Sec. | 4.0 Sec. | 5.0 Sec. |
|---|---|---|---|---|---|
| Sodium Hydroxide | surface remains partially contaminated | surface remains partially contaminated | surface clean | surface clean | surface clean |

We claim:

1. A process for removing contaminants imparted to the melamine/formaldehyde resin containing surface of a decorative laminate by an aluminum release sheet used during the manufacture of the laminate, which comprises contacting the contaminated decorative laminate surface, for from about 1 second to about 15 seconds, with a cleaner consisting essentially of a solution of from about 2.5% to about 50.0%, by weight, based on the total weight of the solution, of an alkali metal hydroxide, said solution having a temperature of from about 30°C. to about 90°C.

2. The process according to claim 1 wherein the so-contacted laminate surface is rinsed with water.

3. The process according to claim 2 wherein said laminate surface is dried.

4. The process according to claim 1 wherein the alkali metal hydroxide is sodium hydroxide, potassium hydroxide or lithium hydroxide.

5. A process according to claim 1 wherein said solution is an aqueous solution.

6. A process according to claim 1 wherein said alkali metal hydroxide is sodium hydroxide.

* * * * *